(12) United States Patent
Wright

(10) Patent No.: US 9,347,425 B2
(45) Date of Patent: May 24, 2016

(54) OFFSHORE FLOATING BARGE TO SUPPORT SUSTAINABLE POWER GENERATION

(71) Applicant: Christopher Wright, Reno, NV (US)

(72) Inventor: Christopher Wright, Reno, NV (US)

(*) Notice: Subject to any disclaimer, the term of this patent is extended or adjusted under 35 U.S.C. 154(b) by 0 days.

(21) Appl. No.: 14/681,025

(22) Filed: Apr. 7, 2015

(65) Prior Publication Data

US 2015/0211477 A1    Jul. 30, 2015

(51) Int. Cl.
| | |
|---|---|
| F03B 13/10 | (2006.01) |
| F03B 13/12 | (2006.01) |
| H02P 9/04 | (2006.01) |
| F03B 13/14 | (2006.01) |
| F03D 11/04 | (2006.01) |
| F03B 13/00 | (2006.01) |
| F03D 9/00 | (2016.01) |
| F16D 31/02 | (2006.01) |
| E02D 27/38 | (2006.01) |
| B63B 35/44 | (2006.01) |

(52) U.S. Cl.
CPC .............. *F03B 13/14* (2013.01); *F03D 11/045* (2013.01); *B63B 2035/446* (2013.01); *B63B 2035/4433* (2013.01); *F05B 2240/93* (2013.01); *F05B 2240/95* (2013.01); *Y02E 10/38* (2013.01); *Y02E 10/727* (2013.01)

(58) Field of Classification Search
USPC .............. 290/53–55; 60/398; 405/210, 223.1, 405/224; 114/264
See application file for complete search history.

(56) References Cited

U.S. PATENT DOCUMENTS

| | | | | |
|---|---|---|---|---|
| 3,029,608 A | * | 4/1962 | Perkins .................... | E02B 17/00 405/208 |
| 3,522,709 A | * | 8/1970 | Vilain ..................... | E21B 15/02 405/202 |
| 3,758,788 A | * | 9/1973 | Richeson ................ | F03B 13/20 290/1 R |
| 3,938,343 A | * | 2/1976 | Lamy .................... | E02B 17/025 405/195.1 |
| 4,159,427 A | * | 6/1979 | Wiedemann ........... | B63H 13/00 290/55 |
| 4,188,157 A | * | 2/1980 | Vigander .............. | E02B 17/025 405/207 |
| 4,285,614 A | * | 8/1981 | Lamy ..................... | E02B 17/02 405/203 |
| 4,472,084 A | * | 9/1984 | Boon .................... | E02B 17/024 405/196 |
| 4,631,921 A | * | 12/1986 | Linderfelt ........... | F03B 13/1845 290/53 |

(Continued)

*Primary Examiner* — Pedro J Cuevas
(74) *Attorney, Agent, or Firm* — Chen-Chi Lin

(57) ABSTRACT

A barge has been designed to function in a four-season environment with a plurality of configurable, peripheral bays (bays) that support sustainable energy capture devices (devices). The barge is round with bays that curve inward, opposite the barge's curvature, and where devices can be placed. The bays allow the devices to be removed for maintenance by support ships. The barge is buoyant and floats independently of the devices in each bay. The barge is hollow and its entire circumference can be traversed by the crew. A central platform is contained within the barge by cables that may have wave energy capture mechanisms installed. The central platform and can be accessed by the crew through one or multiple floating walkways. Devices installed at the bays will float independently of the barge and may have wave energy capture mechanisms on them at the bay-device interface.

18 Claims, 7 Drawing Sheets

Figure 1:
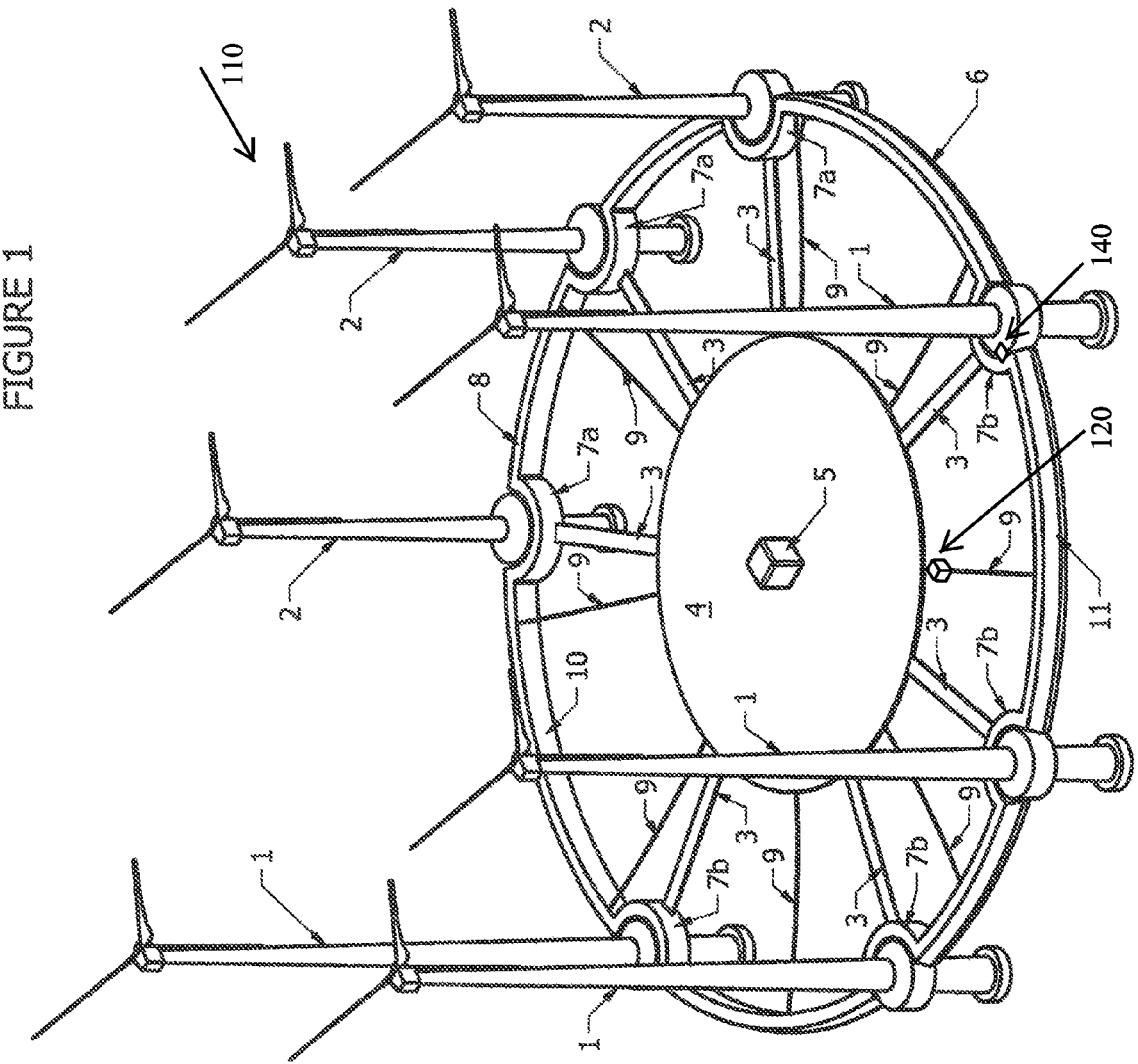

| Item | Description |
|---|---|
| 1 | Back HAWT |
| 2 | Bow HAWT |
| 3 | Platform Access Walkway |
| 4 | Central Platform |
| 5 | Step-Up Transformer |
| 6 | Barge |
| 7a | Bow Bay |
| 7b | Back Bay |
| 8 | Top Side |
| 9 | Cables |
| 10 | Inner Wall |
| 11 | Outer Wall |

(56) References Cited

U.S. PATENT DOCUMENTS

| | | | | |
|---|---|---|---|---|
| 4,792,290 A * | 12/1988 | Berg | F03B 13/1815 | 417/332 |
| 6,100,600 A * | 8/2000 | Pflanz | B01D 61/58 | 290/4 R |
| 6,294,844 B1 * | 9/2001 | Lagerwey | F03D 11/04 | 290/44 |
| 6,749,399 B2 * | 6/2004 | Heronemus | F03D 1/02 | 416/120 |
| 6,766,643 B2 * | 7/2004 | Christensen | F03B 13/147 | 190/53 |
| 6,860,219 B1 * | 3/2005 | Dempster | B63B 21/22 | 114/264 |
| 7,075,189 B2 * | 7/2006 | Heronemus | F03D 9/00 | 290/44 |
| 7,156,037 B2 * | 1/2007 | Borgen | E02D 27/42 | 114/264 |
| 7,156,586 B2 * | 1/2007 | Nim | B63B 35/44 | 405/195.1 |
| 7,215,036 B1 * | 5/2007 | Gehring | F03B 17/061 | 290/54 |
| 7,242,107 B1 * | 7/2007 | Dempster | B63B 21/22 | 290/42 |
| 7,293,960 B2 * | 11/2007 | Yamamoto | F03D 1/02 | 415/3.1 |
| 7,352,078 B2 * | 4/2008 | Gehring | F03B 13/10 | 290/54 |
| 7,508,088 B2 * | 3/2009 | Kothnur | F03D 11/045 | 290/43 |
| 7,629,703 B2 * | 12/2009 | Storbekk | F03B 13/186 | 290/42 |
| 7,726,911 B1 * | 6/2010 | Dempster | B63B 35/44 | 114/256 |
| 7,948,101 B2 * | 5/2011 | Burtch | C25B 1/04 | 290/43 |
| 7,994,649 B2 * | 8/2011 | Abatemarco | F03B 13/10 | 290/43 |
| 8,030,793 B2 * | 10/2011 | Garvey | F02C 1/02 | 290/43 |
| 8,057,127 B2 * | 11/2011 | Lopez | F03D 1/001 | 114/264 |
| 8,096,116 B2 * | 1/2012 | Draper | B63B 21/50 | 290/42 |
| 8,169,099 B2 * | 5/2012 | Roznitsky | F03D 1/001 | 290/44 |
| 8,197,208 B2 * | 6/2012 | Sharples | F03D 1/0608 | 415/7 |
| 8,405,242 B2 * | 3/2013 | Borden | F03D 9/02 | 114/52 |
| 8,471,399 B2 * | 6/2013 | Lefranc | F03D 9/00 | 290/44 |
| 8,484,964 B2 * | 7/2013 | Preftitsis | F03B 19/20 | 60/495 |
| 8,578,586 B2 * | 11/2013 | Yamamoto | F03D 1/02 | 29/525.01 |
| 8,624,416 B2 * | 1/2014 | Wille | F03B 13/20 | 290/53 |
| 8,662,793 B2 * | 3/2014 | Wong | F03D 9/005 | 114/264 |
| 8,664,795 B2 * | 3/2014 | Borden | F03D 9/02 | 290/44 |
| 8,801,332 B2 * | 8/2014 | Elazari-Volcani | F02C 6/16 | 405/210 |
| 8,803,346 B2 * | 8/2014 | Pitre | F03B 13/186 | 290/42 |
| 8,875,805 B2 * | 11/2014 | Advocaat | E02B 17/0021 | 166/350 |
| 8,878,381 B2 * | 11/2014 | Henry | F03B 13/264 | 290/42 |
| 8,956,103 B2 * | 2/2015 | Gehring | F03B 13/10 | 415/7 |
| 9,003,631 B2 * | 4/2015 | Yamamoto | F03D 1/001 | 29/525.01 |
| 9,080,554 B2 * | 7/2015 | Royseth | F03B 13/187 | |
| 9,163,607 B2 * | 10/2015 | Tabe | F03B 13/262 | |
| 2003/0168864 A1 * | 9/2003 | Heronemus | F03D 9/00 | 290/55 |
| 2005/0134050 A1 * | 6/2005 | Salls, Jr. | F03D 9/008 | 290/54 |
| 2006/0165493 A1 * | 7/2006 | Nim | B63B 35/44 | 405/223.1 |
| 2006/0171798 A1 * | 8/2006 | Yamamoto | F03D 1/02 | 415/4.5 |
| 2006/0261597 A1 * | 11/2006 | Gehring | F03B 13/1885 | 290/44 |
| 2007/0001464 A1 * | 1/2007 | Kothnur | F03D 11/045 | 290/55 |
| 2007/0120371 A1 * | 5/2007 | Gehring | F03B 17/061 | 290/54 |
| 2007/0138021 A1 * | 6/2007 | Nicholson | B63H 19/00 | 205/628 |
| 2008/0036213 A1 * | 2/2008 | Storbekk | F03B 13/186 | 290/53 |
| 2008/0231053 A1 * | 9/2008 | Burtch | C25B 1/04 | 290/52 |
| 2008/0240864 A1 * | 10/2008 | Belinsky | E02D 27/42 | 405/223.1 |
| 2009/0162144 A1 * | 6/2009 | Ayre | E02B 9/08 | 405/76 |
| 2009/0196748 A1 * | 8/2009 | Salter | F03D 1/001 | 416/120 |
| 2010/0050500 A1 * | 3/2010 | Pieraccini | C10G 2/30 | 44/300 |
| 2010/0116684 A1 * | 5/2010 | Sawyer | F03D 9/00 | 205/628 |
| 2010/0194115 A1 * | 8/2010 | Jakubowski | E02D 27/42 | 290/55 |
| 2010/0219645 A1 * | 9/2010 | Yamamoto | F03D 1/001 | 290/55 |
| 2010/0230965 A1 * | 9/2010 | Pitre | F03B 13/186 | 290/42 |
| 2010/0244450 A1 * | 9/2010 | Tabe | F03B 13/262 | 290/53 |
| 2010/0278630 A1 * | 11/2010 | Yamamoto | F03D 1/02 | 415/60 |
| 2011/0037264 A1 * | 2/2011 | Roddier | B63B 35/44 | 290/44 |
| 2011/0049992 A1 * | 3/2011 | Sant'Anselmo | F03D 1/005 | 307/64 |
| 2011/0206466 A1 * | 8/2011 | Rawles, II | E02D 27/52 | 405/223.1 |
| 2011/0285136 A1 * | 11/2011 | Desmeules | F03B 17/061 | 290/54 |
| 2014/0245941 A1 * | 9/2014 | Haider | B63B 35/44 | 114/264 |
| 2014/0290233 A1 * | 10/2014 | Hine | B63H 19/02 | 60/327 |
| 2014/0367969 A1 * | 12/2014 | Pitre | F03B 13/186 | 290/50 |
| 2015/0175246 A1 * | 6/2015 | Huang | B63B 35/4413 | 114/264 |
| 2015/0204302 A1 * | 7/2015 | Kalnay | F03B 13/1815 | 60/498 |

* cited by examiner

| Item | Description |
|---|---|
| 1 | Back HAWT |
| 2 | Bow HAWT |
| 3 | Platform Access Walkway |
| 4 | Central Platform |
| 5 | Step-Up Transformer |
| 6 | Barge |
| 7a | Bow Bay |
| 7b | Back Bay |
| 8 | Top Side |
| 9 | Cables |
| 10 | Inner Wall |
| 11 | Outer Wall |

BARGE SUPPORTING SUSTAINABLE POWER GENERATION
PLAN VIEW

BARGE SUPPORTING SUSTAINABLE POWER GENERATION
ELEVATION VIEW
(PORT)

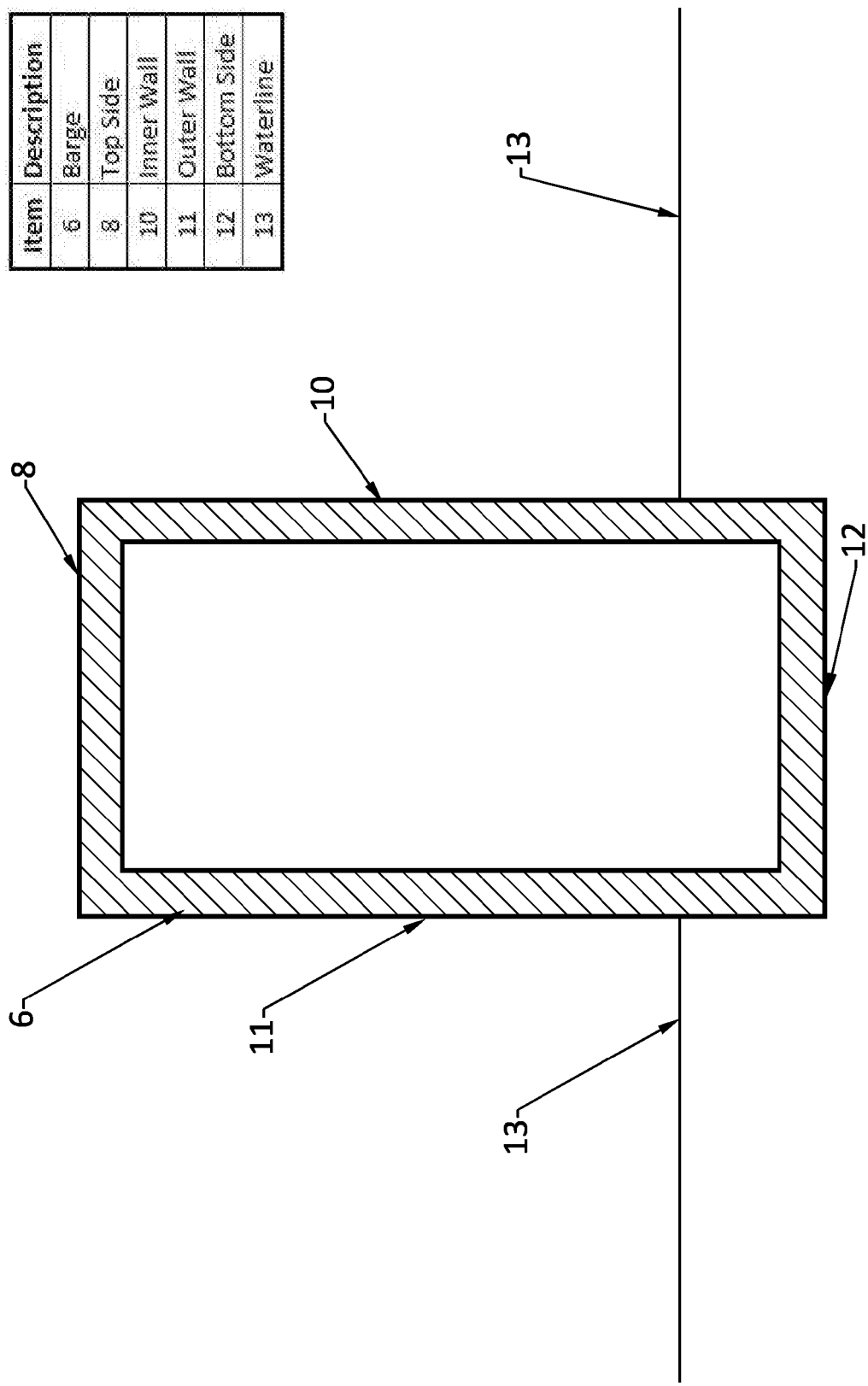

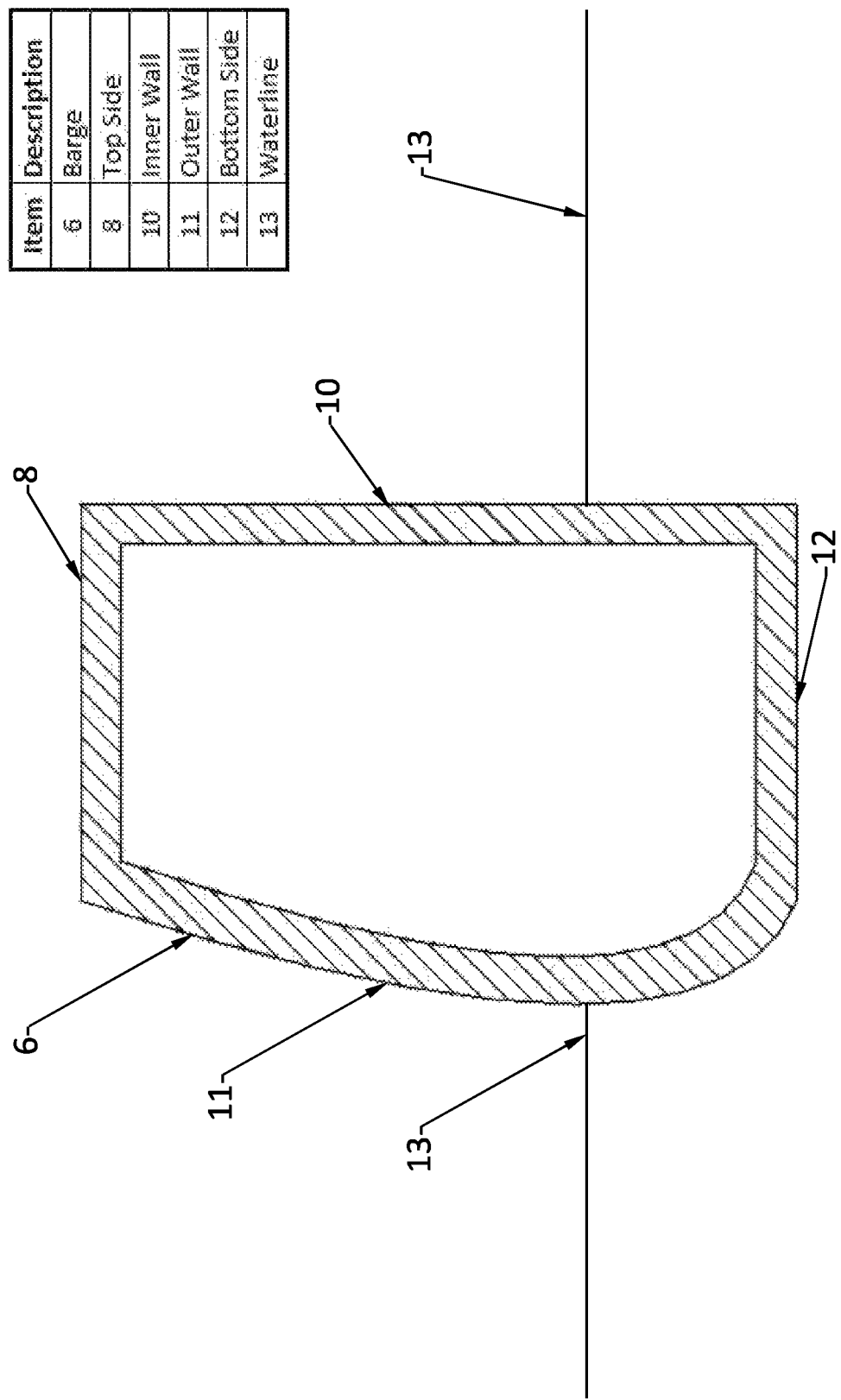

OFFSHORE FLOATING BARGE TO SUPPORT SUSTAINABLE POWER GENERATION

CROSS-REFERENCE TO RELATED APPLICATION

This application claims priority of United States of America (U.S.) Provisional Application Ser. No. 62/007,029 filed Jun. 3, 2014.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Field of the Invention

The present invention relates generally to floating platforms that support sustainable energy producing mechanisms like wind, wave, solar, and tidal.

There are many reasons to locate sustainable energy creation devices offshore. Offshore wind is where the strongest winds in the world are located. Also, wave and tidal energy is located there. In calm conditions, the sun generally shines and with no trees or other shade-causing structures, solar energy generation should be a consideration. Thermal differences in water can also provide energy creation options. Offshore locations are not in anyone's back yard so there will be less public outcry due to noise, visibility, strobing effect, transmission lines, or property value impacts. Eminent domain issues can be minimized with offshore locations. Therefore, offshore locations are preferred for sustainable energy production.

There are many challenges with locating sustainable energy capture devices offshore. For example, a wind turbine embedded in the ocean/lakebed permanently is very expensive to build. Because it is permanent, lengthy permits need to be obtained which require lengthy studies to be completed, including geotechnical/foundation studies to determine how deep into the ocean/lakebed a tower must be embedded. For turbines embedded in the ocean/lakebed, the pieces used for construction are quite heavy.

Multi-megawatt (MW) wind power generation units generally have hub heights of around 285 feet (') (86.9 meters (m)) and lifting large weights, 100 (90.7 metric tonnes (Mt)) to 300 tons (272 Mt), to this height requires large ships with powerful cranes to meet these demands. These large crane ships are very expensive. Because the crane ships are so expensive, there are few of them available at any given time to ensure the ships are fully utilized. This means wind energy capture devices must wait in a queue for maintenance. This lowers availability of the wind energy capture devices and lowers the economic viability of offshore wind energy production. People working at these heights also are put at significant safety risks.

Permanent wind energy capture devices located offshore can only be used for one purpose. This lack of functional flexibility also lowers the economic viability of sustainable offshore wind energy production.

Permanent wind energy capture devices located offshore can be damaged by ice flows/icebergs and destroyed. This level of risk is borne by offshore wind farm financiers and also lowers the economic viability of sustainable offshore wind energy production.

Large floating wind turbines that are assembled at dry dock and towed into position require large, specially built docks with cranes that can reach heights of over 300'.

U.S. Pat. No. 4,159,427 "Apparatus for Using Natural Energies" (Weidemann) discloses a floating system using a hull design like a ship, either singular or dual, that supports a superstructure that holds various kinds of natural energy capture devices such as multiple wind turbines.

U.S. Pat. No. 6,100,600 "Maritime Power Plant System with Processes for Producing Storing and Consuming Regenerative Energy" (Pflanz) discloses a floating system that creates energy from regenerative means above and below ocean waves like wind, wave, solar, chemical, and temperature. It can support multiple wind turbines, but unlike this invention, it does not disclose the type or means of floatation.

U.S. Pat. No. 6,294,844 "Artificial Wind Turbine Island" (Lagerwey) discloses a floating system using a hull design like a ship, either singular or multiple, to support multiple wind turbines. It has the capability to rotate about a vertical axis to turn into the wind.

U.S. Pat. No. 7,075,189 "Offshore Wind Turbine with Multiple Wind Rotors and Floating System" (Heronemus) discloses a floating system of arrayed wind turbines for the purpose of producing hydrogen-based fuels far offshore. Various buoyant hulls are embodied, but none are similar to this invention.

US20120139255 "Technology for Combined Offshore Floating Wind Power Generation" (Zhu) discloses a floating system for supporting wind turbines and solar panels with wave/tidal capture devices attached to the octagonal frame. Each point of the octagonal frame has an independent corner floating unit. The connecting supports (8) float and have a plurality of independent chambers in it.

WO2014055027A1 "Floating Platform and Energy Production Plant" (Tunbjer) discloses floating or semi-submersible system for supporting wind turbines. It comprises at least three peripheral floating or semi-submersible units rigidly connected to a central floating or semi-submersible unit. The rigid connections can compress to capture wave/tidal energy.

BRIEF SUMMARY OF THE INVENTION

Object of the Invention

This invention differs from prior art in that a barge has been designed to support sustainable power generation (exempli gratia (e.g.), wind, wave, solar, et cetera (etc.)) in a four-season, shallow (50' (15.2 m) to 60' (18.3 m) offshore environment with a plurality of configurable bays that support sustainable energy capture devices. The barge is round or mostly round with a plurality of peripheral bays that curve inward, opposite the barge's curvature, and where sustainable energy capture devices can be placed. The bays allow the sustainable energy capture devices to be easily removed for maintenance on site by support ships. The bays are positioned such that no undesirable elements (e.g. turbulence, shade, etc.) can sap energy from the other sustainable energy capture devices. The barge is buoyant and floats independently of the sustainable energy capture devices in each bay. The barge is hollow and its entire circumference can be traversed by the crew; safe from harsh environments. Ice challenges will be mitigated by its shape and aeration of the water around the outside of the floating barge. A central platform is contained within the barge by cables that may have wave energy capture devices installed. The central platform can be accessed by the crew through one or multiple floating walkways. Sustainable energy capture devices at the bays will float independently of the barge and may have wave energy capture devices on them at the bay-device interface.

Advantages of the Invention

In order to meet the demands unique to offshore sustainable energy farms, a floating barge has been designed with an all-encompassing, systems approach. The barge is an integral part of a sustainable energy creation system. The advantage of this is lower total costs and operating costs because the total costs of the project were considered during the design.

The barge is designed to operate in shallow waters about 55' (16.8 m) deep as well as deep waters, support a plurality of sustainable energy capture devices, survive winters with pack ice, and be capable of supporting some sort of industry (e.g. industrial, recreational, residential, etc.). The advantage of this is better survivability and more available sites from which to choose for installing sustainable energy farms.

By being close to shore in shallow waters, shorter cables lengths are required to bring electricity to onshore customers. The barge will allow for a draft of between 25' (7.6 m) and 45' (13.7 m). This will allow it to be placed close to shore (2-5 miles). The advantage of this is lower total costs and operating costs than the current state of the art.

If the barge is placed hundreds of miles from the coast, energy generated on it may be used for the industry employed on the floating, central platform (Platform) (e.g. industrial, recreational, residential, etc.) or it may be transmitted to land through an underwater cable. The advantage of this is enhanced marketability and functional flexibility.

The barge has a plurality of bays on it. The bays allow the sustainable energy capture devices to be removed quickly for onsite maintenance. There can be a different sustainable energy capture device associated with each bay. Each one could be studied and evaluated in a natural environment in order to enhance each sustainable energy capture device's capabilities using real-world data. The sustainable energy capture devices are meant to be quickly and easily removed for fast, onsite service. This will lower maintenance downtime and increase the availability of the sustainable energy capture devices.

The barge will survive winters in pack ice by being round or mostly round. This will prevent ice forces from concentrating anywhere on the barge. It also has a common aeration system. Air compressors will push air through air hoses around the ship to air stones lowered down into the water that churns up warm water from below to the surface and agitates the water that, in turn, melts ice within close proximity to the barge. The advantage of this is lower operating costs and improved safety because there will be less damage to the barge each winter.

Optionally, wave energy capture devices will be deployed. Tensioned cables holding the Platform in place relative to the barge may each have a wave energy capture device to harness the horizontal component of wave energy as the Platform moves independently of the barge. Each interface between the bay and the sustainable energy capture device may have a wave energy capture device to harness the vertical component of wave energy as the sustainable energy capture device bobs differently in relation to the bay. The advantage of this is greater energy creation from a single unit.

The Platform has been integrated into the design to provide functional flexibility. The Platform will hold the step-up transformer. In the currently considered embodiments, the Platform will be approximately 79' (24 m) to 450' (61 m) in diameter or 0.11 acres (ac) (0.05 hectares (ha)) to 3.65 ac (1.48 ha) in area, but can be bigger given a location in deeper water. It may also hold some sort of industry (e.g. industrial, recreational, residential, etc.) that will utilize the energy generated on the barge. Depending on the demand from this industry, electricity may not be transmitted onshore. In this embodiment, the barge and Platform will act as a self-powered island. The advantage of this is greater marketing potential as a self-powered island with plenty of electricity and potentially free from government constraints because it is located hundreds of miles from the coast in international waters.

The barge is hollow and allows the crew access around the entire watercraft. This keeps the crew out of the elements and much safer than walking on top of it where wind and waves can create risky situations regarding safety. The barge's hollow nature also provides its buoyancy. If any or all of the multiple sustainable energy capture devices becomes disabled and sink(s), the barge will remain afloat.

The barge has bow and stern thrusters to more quickly position it into the wind for improved efficiency when there are wind turbines in the configuration. In winds too slow to align the barge with a weather front approaching from a different direction, thrusters are incorporated at each bay to align the barge. The thrusters are powered by stored electricity generated on the barge. The advantage of this is increased efficiency as it may take up to 45 minutes for the wind to "weathervane" or align the barge into the most efficient position while the thrusters could do the job in about 10 minutes.

The barge is attached to a mooring system that allows the barge to "weathervane" around the anchor. If the barge is too slow to move into place using the natural wind-catching capabilities of the design, wind vanes or fins may be added where necessary. In some embodiments, station-keeping may be computerized with the thrusters for increased efficiency.

The barge's design produces lower initial capital costs than permanently embedded sustainable energy capture devices in the ocean/lakebed. It also lays the groundwork for lower operating costs than the current state of the art by merging industry with sustainable energy generation. Initially, it can be used as a real-world test bed for various sustainable energy capture devices. Lessons learned from these types of studies will enhance the sustainable energy capture devices, further improving their economics. This invention will lower the cost of sustainable energy to consumers.

The position of the wind turbines relative to each other is fixed when locked in place at each bay. This reduces the wake effect where wind turbulence coming off the tips of each blade increases wind shear and reduces turbine efficiency on the downwind turbines. Also, with three lower turbines in the bow and four higher turbines in the stern, this positioning also serves to capture more air in the middle of the barge that aids in its "weathervaning" and increases airflow through the four back turbines.

If the barge needs to be relocated, support equipment can tow it to another location. The advantage of this is as political winds change, offshore wind may be outlawed in one country and welcomed in another and costs would be lower for relocation of this invention than for the current state of the art.

If the barge needs to be decommissioned, it can easily be removed leaving no trace or lasting impact on the environment. If local authorities require it, it can be sunk to provide an artificial reef after the sustainable energy generation devices are removed.

If one sustainable energy capture method is deemed unlawful by local authorities and it is currently in use, support ships can quickly change out the unwanted sustainable energy capture devices with those that are needed.

In the embodiment shown in FIGS. 1 through 5, the barge has 7 bays where horizontally aligned wind turbines (HAWT) are located. While the embodiment shown has 7 bays where different sustainable energy capture devices can be installed, it should be understood that alternative embodiments of the barge may be provided with a different number of bays, particularly where a smaller or larger barge is desired or required.

BRIEF DESCRIPTION OF THE SEVERAL VIEWS OF THE INVENTION

Figure 2:
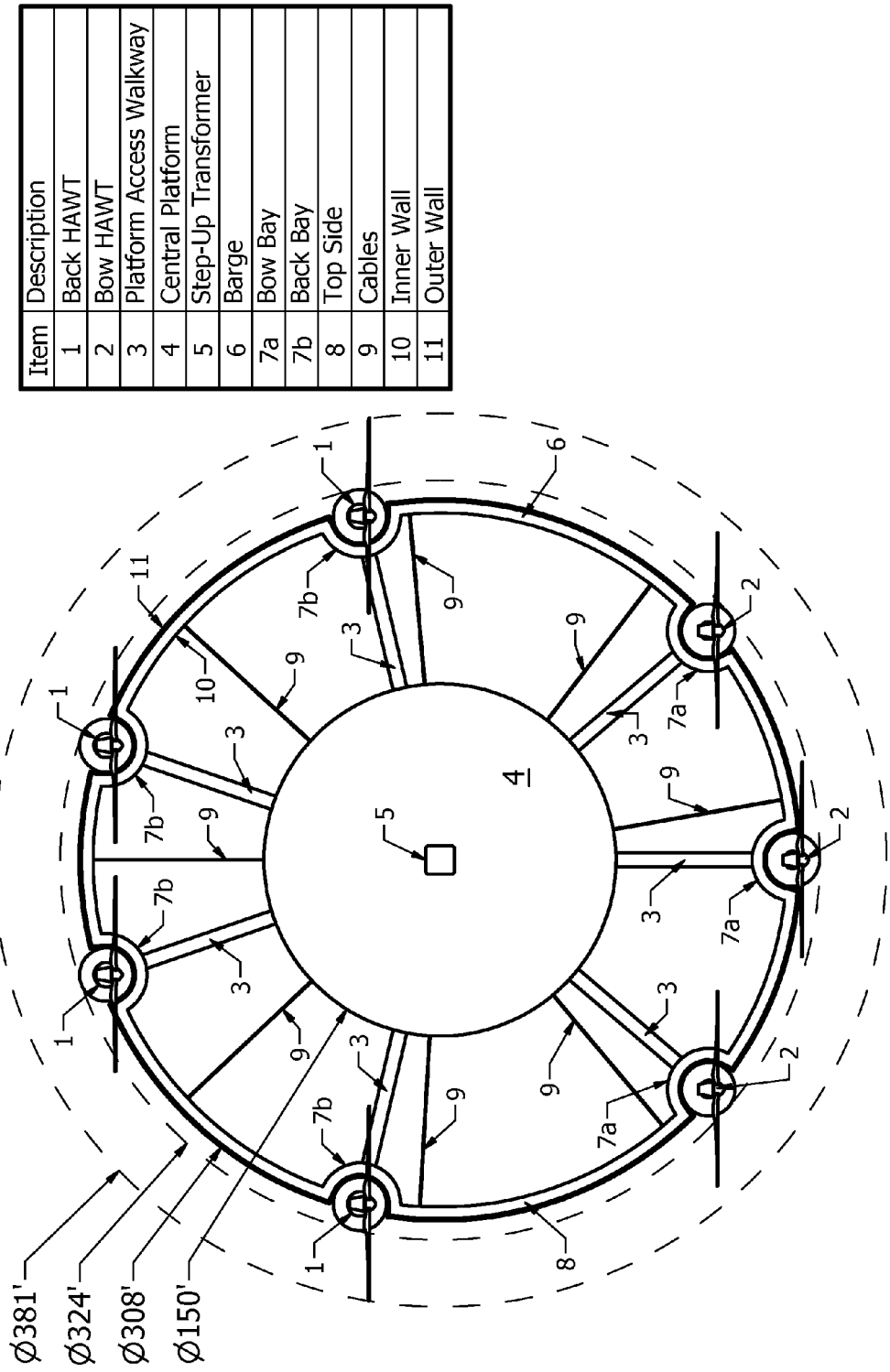
Figure 3:
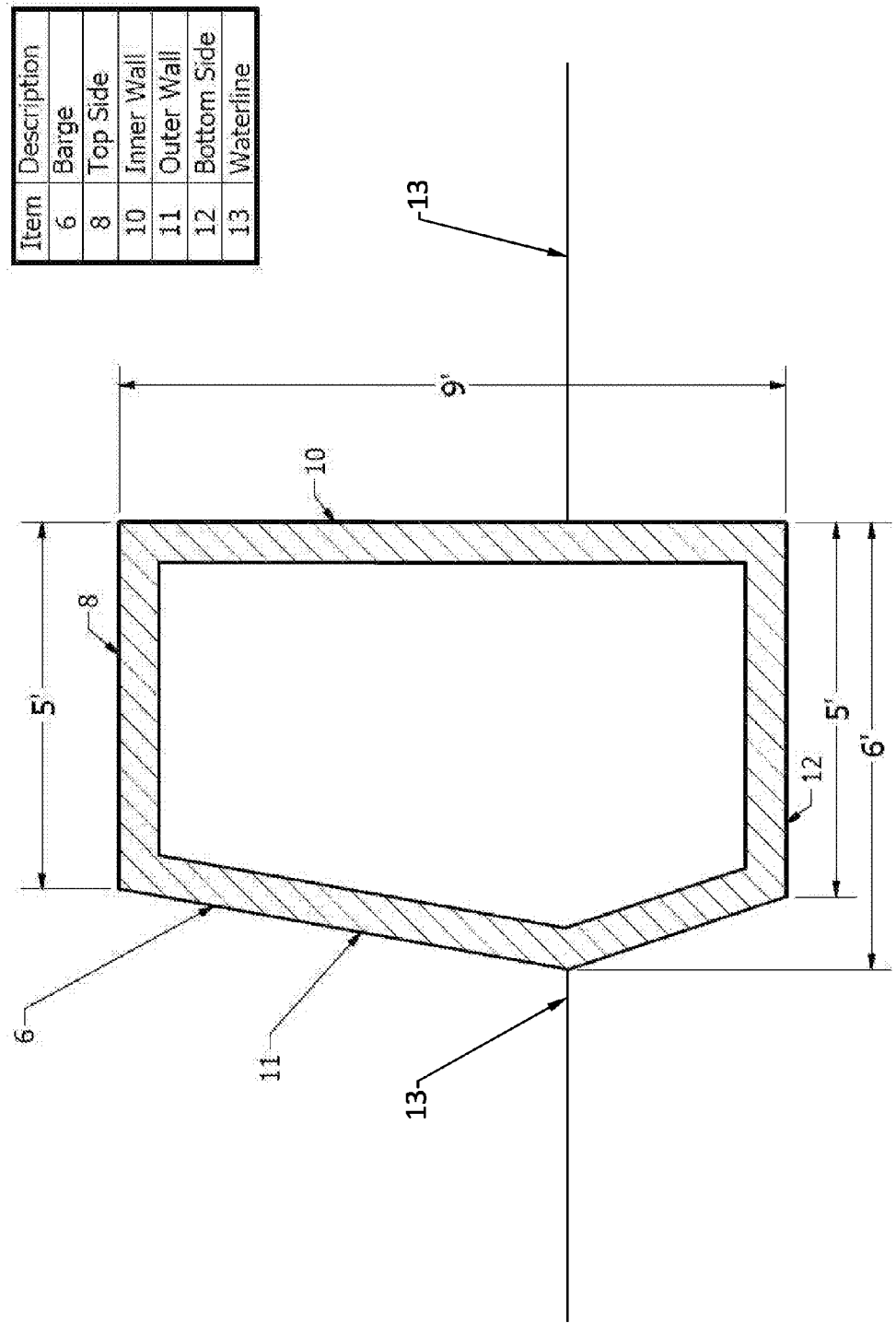
Figure 4:
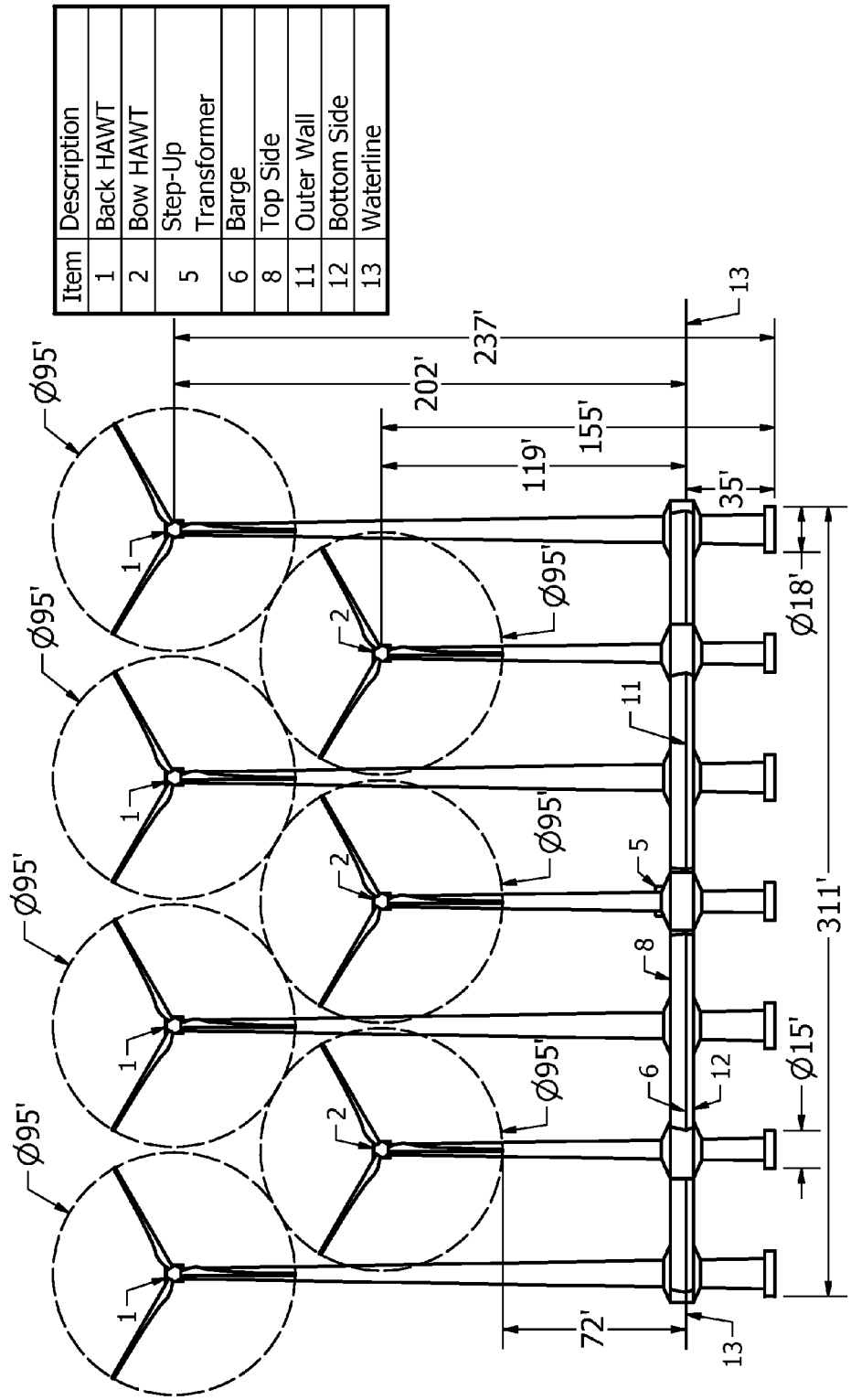
Figure 5:
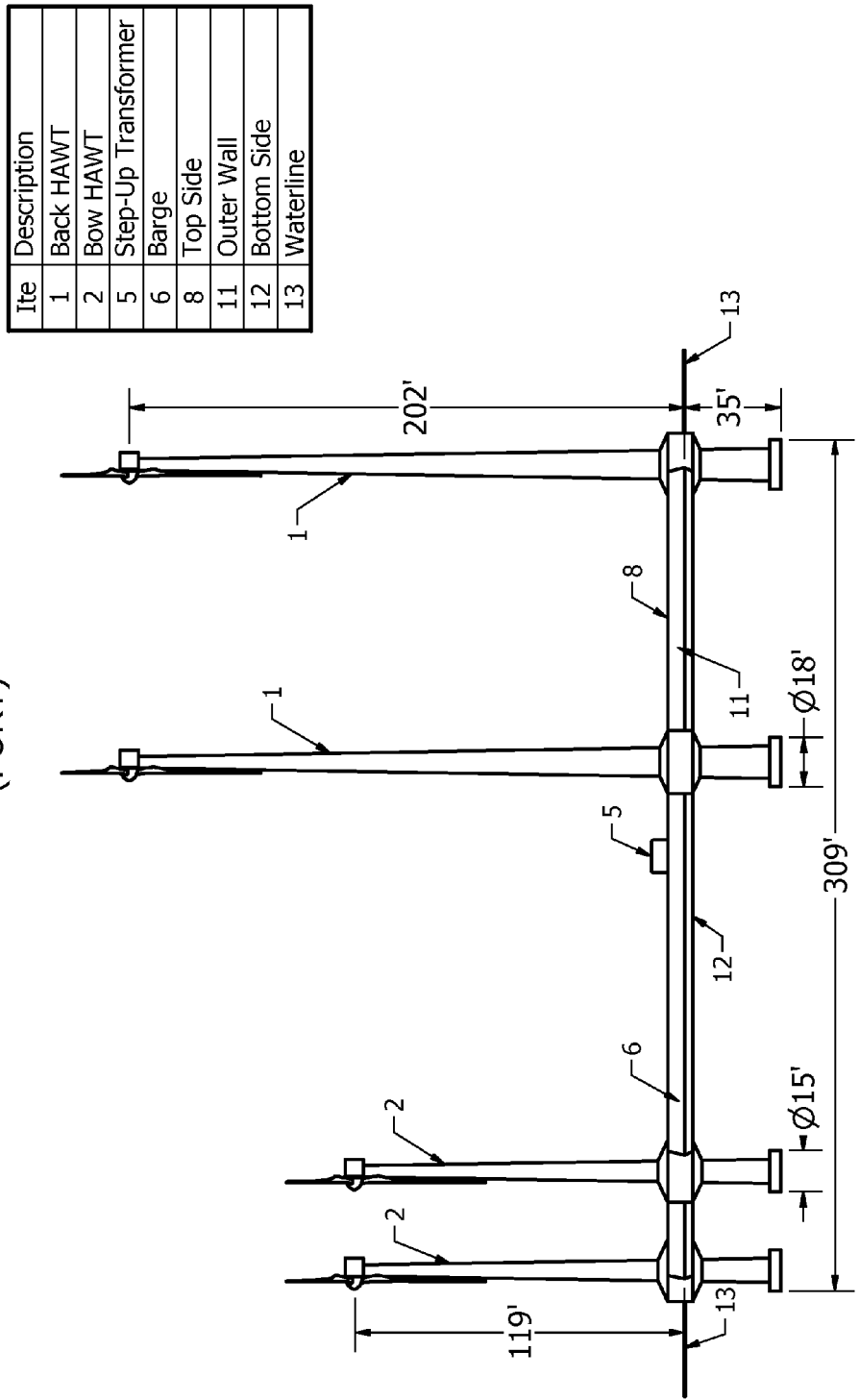

FIG. 1 is an isometric view of the barge;
FIG. 2 is a plan view of the barge;
FIG. 3 is a section view of the barge;
FIG. 4 is an elevation view of the bow of the barge;
FIG. 5 is an elevation view of the port side of the barge;
FIG. 6 is a section view of another barge;
FIG. 7 is a section view of still another barge.

DETAILED DESCRIPTION OF THE INVENTION

Definitions

Barge: The floating, tubular, ship that is typically round or nearly round, but may be in any number of different configurations that support several sustainable energy capture devices at each bay and that has thrusters for station keeping.

Central Platform (Platform): A barge in the middle of the peripheral barge. It can be any shape that works effectively with the shape of the peripheral barge. In the embodiment shown in the figures, it is round where the peripheral barge is generally ring-shaped.

Bay: The location on the barge where the sustainable energy capture device is secured. The bay is a gap in the peripheral barge that is closed by an opposite-curving portion allowing the sustainable energy capture device to be removed.

Bow Bay: There are 3 front bays on the side of the barge considered the bow. The mooring cables may be attached on this side of the barge so the front bays are upwind of the back bays although any number of rigging configurations are possible.

Back Bay: There are 4 back bays on the side of the barge considered the stern. The back bays are downwind (wind direction 110 of FIG. 1) of the front bays.

Sustainable Energy Capture Device: In the embodiment shown in FIGS. 1-5, the 7 HAWT serve this purpose. Other sustainable energy capture devices could include vertically aligned wind turbines (VAWT), solar panels, wave energy capture mechanisms, or tidal energy capture mechanisms.

DETAILED DESCRIPTION OF THE FIGURES

In FIG. 1, the presented embodiment of the "Barge" (6) is viewed from an isometric perspective. Item 1 is the "Back HAWT." It is a sustainable energy capture device translating wind energy to electrical energy and is attached to the "Barge" (6) at a "Back Bay" (7b). At the bay/device interface, a wave energy capture device 140 may be installed. "Back HAWT" are taller than "Bow HAWT" (2). Item 2 is the "Bow HAWT." It is a sustainable energy capture device translating wind energy to electrical energy and is attached to the "Barge" (6) at a "Bow Bay" (7a). At the bay/device interface, a wave energy capture device may be installed. "Bow HAWT" are as close to the waterline (FIG. 4) (13) as possible. Item 3 is a floating "Platform Access Walkway" and connects the bays (7) to the "Central Platform" (4). Item 4 is the floating, "Central Platform." It is secured to the "Barge" by "Tensioned Cables" (9). Item 5 is a representation of the "Step-up Transformer." Item 6 is the floating, peripheral "Barge." The "Barge" is round, but may be nearly round. It is basically a hollow tube. The barge is buoyant. It is made of aluminum in this embodiment, but may be constructed of any economic material depending upon its project-specific industrial use. It is flat on the "Top Side" (8), "Inner Wall" (10), and "Bottom Side" (FIG. 3) (12), but may be any shape based upon manufacturing efficiencies. Item 7a is the "Bow Bay." There are three "Bow Bays." Item 7b is the "Back Bay." There are four "Back Bays." Item 8 is the "Top Side" of the "Barge" (6). Item 9 is a tensioned cable securing the "Central Platform" (4) to the "Barge" (6). Wave energy capture devices 120 may be installed on these cables. Item 10 is the "Inner Wall" of the "Barge." Item 11 is the "Outer Wall" of the "Barge."

In FIG. 2, the presented embodiment of the "Barge" (6) is viewed in plan. Item 1 is the "Back HAWT." Item 2 is the "Bow HAWT." Item 3 is a "Platform Access Walkway." It is 6' (1.8 m) wide and connects the bays (7) to the "Central Platform" (4). There may be any number of these walkways not to exceed the number of bays. Item 4 is the "Central Platform." In the presented embodiment, the "Central Platform" is round and has a 150' (45.7 m) diameter and an area of 0.41 ac (0.16 ha) that holds the "Step-up Transformer" (5) and may hold a laboratory, office, community, factory, greenhouse, desalination plant or the like. The crew can get to the "Central Platform" by 7 "Platform Access Walkways" (3), one from each bay, but may be accessed by any number of "Platform Access Walkways" (3) if a particular design requires it. Item 5 is a representation of the "Step-up Transformer." Electricity generated from each bay (7) is collected at the "Step-up Transformer" on the "Central Platform" (4). Item 6 is the "Barge." In the presented embodiment, the "Barge" has an outside diameter of 308' (93.9 m) enabling it to hold 7 HAWTs (1) (2) with about a 95' (29 m) rotor diameter (FIG. 4) (1) (2), but may be of any diameter. The size of the "Barge" is determined by the wind-swept area of the blades (FIG. 4) (1) (2). It is 6' (1.8 m) wide at the waterline. Item 7a is the "Bow Bay." Item 7b is the "Back Bay." Item 8 is the "Top Side" of the "Barge" (6). Item 9 is a tensioned cable securing the "Central Platform" (4) to the "Barge" (6). There are 8 cables in this embodiment. Item 10 is the "Inner Wall" of the "Barge" (6). Item 11 is the "Outer Wall" of the "Barge" (6).

In FIG. 3, the presented embodiment of the "Barge" (6) is viewed in section. Item 6 is the "Barge." In this embodiment, the "Barge" has a maximum width of 6' (1.8 m), but may be of any width. It has a height of 9' (2.7 m), but may be of any height. Item 8 is the "Top Side" of the "Barge" (6). In this embodiment, it is flat and about 5' 2 inches (") wide, but may be curved, if necessary and any width depending on space requirements. Item 10 is the "Inner Wall" of the "Barge" (6). In this embodiment, it is straight and 9' (2.7 m) high, but may be curved, if necessary and any width depending on space requirements. Item 11 is the "Outer Wall" of the "Barge." In this embodiment, the "Outer Wall" has two straight, angled planes that meet at the "Waterline" (13), but the "Outer Wall" may be straight if ice mitigation is highly effective. The "Outer Wall" may be curved, if necessary and any height depending on space requirements. This design sheds and prevents the concentration of forces due to waves or ice. Item 12 is the "Bottom Side" of the "Barge" (6). In this embodiment, it is flat and about 5'-2" wide, but may be curved, if necessary and any width depending on space requirements. Item 13 is the "Waterline" location.

In FIG. 4, the presented embodiment of the "Barge" (6) is viewed from a bow, elevation perspective. Item 1 is the "Back HAWT." The "Back HAWT" has a hub height of 206' (62.8 m) above the "Waterline" (13) for a maximum height of about 253' (77.1 m) due to the length of the blades; about 47' (14.5 m). Overall heights can be reduced depending on local regulations and wind resource characteristics. Item 2 is the "Bow HAWT." The bow HAWTs have hub heights of 119' (36.3 m) for a maximum height of about 166' (50.6 m) due to the length of the blades about 47' (14.5 m). Bow heights can be reduced depending on local regulations and wind resource characteristics. Item 5 is a representation of the "Step-up Transformer." Item 6 is the "Barge." In the presented embodiment, the "Barge" is 9' (2.7 m) high. Item 8 is the "Top Side" of the "Barge" (6). In this embodiment, it is flat, but may be curved, if necessary. Item 11 is the "Outer Wall" of the "Barge." In this embodiment, the "Outer Wall" has two straight, angled planes that meet at the "Waterline" (13), but the "Outer Wall" may be straight (FIG. 6) if ice mitigation is highly effective. The "Outer Wall" may be curved (FIG. 7), if necessary and any height depending on space requirements. Item 12 is the "Bottom Side" of the "Barge" (6). In this embodiment, it is flat, but may be curved, if necessary. Item 13 is the "Waterline" location.

In FIG. 5, the presented embodiment of the "Barge" (6) is viewed from a port elevation perspective. Item 1 is the "Back HAWT." The "Back HAWT" has a hub height of 206' (62.8 m) above the "Waterline" (13) for an overall height of about 253' (77.1 m) due to the length of the blades; about 47' (14.5 m). Overall heights can be reduced depending on local regulations and wind resource characteristics. Item 2 is the "Bow HAWT." The bow HAWTs have hub heights of 119' (36.3 m) for a maximum height of about 166' (50.6 m) due to the length of the blades; about 47' (14.5 m). Bow heights can be reduced depending on local regulations and wind resource characteristics. Item 5 is a representation of the "Step-up Transformer." Item 6 is the "Barge." In the presented embodiment, the "Barge" is 9' (2.7 m) high. Item 8 is the "Top Side" of the "Barge" (6). In this embodiment, it is flat, but may be curved, if necessary. Item 11 is the "Outer Wall" of the "Barge." In this embodiment, the "Outer Wall" has two straight, angled planes that meet at the "Waterline" (13), but the "Outer Wall" may be straight if ice mitigation is highly effective. The "Outer Wall" may be curved, if necessary and any height depending on space requirements. Item 12 is the "Bottom Side" of the "Barge" (6). In this embodiment, it is flat, but may be curved, if necessary. Item 13 is the "Waterline" location.

While values for dimensions, sizes and measurements have been provided in this specification for various components of the barge and the systems making up the barge, it should be understood that such values are for purposes of description and example only. Actual values may vary greatly depending on the particular designs chosen while still being within the scope and spirit of the invention.

Electric cables run from each bay (7) to the "Central Platform" (4) to the "Step-up Transformer" (5) and along the rigging to the anchor, eventually being laid on the ocean/lakebed leading to land and the substation and/or customers.

The invention is to be manufactured of aluminum onshore in about 10 pieces that are sealed and buoyant. The pieces will be transported to a dock and attached to support ships. The support ships will tow the pieces to the site. Once at the site, the first two pieces will be quickly bolted together. The third through ninth pieces will then be bolted to the predecessors one at a time and the partially assembled "Barge" (6) will be moved, or rotated, to allow space for the next piece to be moved into place. It is held in place by the support ships.

The "Central Platform" (4) parts will then be loaded onto supports ships, taken to the site and assembled through the remaining gap in the "Barge" (6). Next, "Tensioned Cables" (9) secure it to the "Barge" (6) and the appropriate number of "Platform Access Walkways" (3) are installed then the "Barge" (6) is closed by bolting on the tenth pieces, closing the ring. The invention is then connected to the rigging.

The seals are then broken so the "barge" (6) can be welded together at each connection. Air bladders will then be placed under the bolted areas of each piece and inflated to lift the "Barge" (6) above the water in order to weld it together.

It is anticipated that efficiencies will be discovered as the installation process is performed repeatedly. The pieces may be sealed or not, bolted together in the water, on the support ships, or in dry dock. It is desired to transport the unit to the site as quickly as possible and install it as quickly, simply, and safely as possible.

Each sustainable energy capture device will be assembled onshore, as completely as practicable, transported to the dock, loaded onto a support ship, and towed to the site for installation.

The invention claimed is:

1. An offshore floating system comprising:
   a ring-shaped barge having a bow portion and a stern portion; a plurality of bow bays being in the bow portion; a plurality of stern bays being in the stern portion;
   a plurality of bow energy capture devices attached to the plurality of bow bays;
   a plurality of stern energy capture devices attached to the plurality of stern bays;
   a central platform;
   a plurality of tensioned cables connecting the central platform to the ring-shaped barge; and
   a plurality of walkways connecting the central platform to the ring-shaped barge.

2. The offshore floating system of claim 1, wherein the plurality of bow energy capture devices include a plurality of bow wind turbines; the plurality of stern energy capture devices include a plurality of stern wind turbines; and the plurality of bow wind turbines are located closer to a waterline than the plurality of stern wind turbines.

3. The offshore floating system of claim 2, wherein the plurality of bow wind turbines and the plurality of stern wind turbines each rotate about a respective axis parallel to a first axis.

4. The offshore floating system of claim 3, wherein the plurality of bow wind turbines are symmetric with respect to the first axis and the plurality of stern wind turbines are symmetric with respect to the first axis.

5. The offshore floating system of claim 1, wherein the ring-shaped barge is made of an aluminum material.

6. The offshore floating system of claim 1, wherein the ring-shaped barge is a hollow tube configured to allow workers to walk therein.

7. The offshore floating system of claim 1 further comprising a plurality of wave or tidal energy capture devices attached to the plurality of tensioned cables.

8. The offshore floating system of claim 1 further comprising a first plurality of wave or tidal energy capture devices and a second plurality of wave or tidal energy capture devices;

wherein the first plurality of wave or tidal energy capture devices are arranged at first interfaces between the plurality of bow bays and the plurality of bow energy capture devices and wherein the second plurality of wave or tidal energy capture devices are arranged at second interfaces between the plurality of stern bays and the plurality of stern energy capture devices.

9. The offshore floating system of claim 1 further comprising a step-up transformer located on the central platform.

10. The offshore floating system of claim 1, wherein the ring-shaped barge has an upper outer surface and a lower outer surface; wherein a first slope of the upper outer surface is different from a second slope of the lower outer surface; and wherein an interface between the upper outer surface and the lower outer surface is located at a waterline.

11. The offshore floating system of claim 1, wherein the ring-shaped barge has a straight outer surface.

12. The offshore floating system of claim 1, wherein the ring-shaped barge has a curved outer surface.

13. The offshore floating system of claim 1, wherein a number of the plurality of walkways is equivalent to or less than a number of the plurality of bow bays and the plurality of stern bays.

14. The offshore floating system of claim 13, wherein the central platform is located at a center of the ring-shaped barge and the plurality of walkways each have a same length.

15. The offshore floating system of claim 1, wherein the plurality of bow bays and the plurality of stern bays each curve towards a center of the ring-shaped barge.

16. The offshore floating system of claim 1, wherein the plurality of bow energy capture devices and the plurality of stern energy capture devices each float on a water surface and each have a bottom surface lower than a bottom surface of the ring-shaped barge.

17. The offshore floating system of claim 1, wherein bottom surfaces of the plurality of bow energy capture devices and the plurality of stern energy capture devices are co-planar.

18. A method of manufacturing the offshore floating system of claim 1, the ring-shaped barge comprising:
   a plurality of barge sections; and
   a last barge section
the method comprising the steps of:
   preparing the plurality of barge sections and the last barge section on shore;
   sealing the plurality of barge sections and the last barge section;
   moving the plurality of barge sections to an offshore destination;
   assembling the plurality of barge sections;
   moving the central platform to the offshore destination;
   moving a plurality of unconnected tensioned cables and a plurality of unconnected walkways to the offshore destination;
   connecting the plurality of unconnected tensioned cables between the central platform and the plurality of barge sections;
   connecting the plurality of unconnected walkways between the central platform and the plurality of barge sections;
   moving the last barge section to the offshore destination;
   attaching the last barge section to the plurality of barge sections;
   moving the plurality of bow energy capture devices and the plurality of stern energy capture devices to the offshore destination; and
   installing the plurality of bow energy capture devices and the plurality of stern energy capture devices.

* * * * *